United States Patent [19]

Chigusa et al.

[11] Patent Number: 5,430,824
[45] Date of Patent: Jul. 4, 1995

[54] OPTICAL FIBRE, WAVEGUIDE, AND OPTICAL ACTIVE DEVICE

[75] Inventors: Yoshiki Chigusa; Masashi Onishi; Takashi Kohgo; Minoru Watanabe, all of Yokohama; Izumi Sankawa, Mito, all of Japan

[73] Assignees: Sumitomo Electric Industries, Ltd., Osaka; Nippon Telegraph and Telephone Corporation, Tokyo, both of Japan

[21] Appl. No.: 104,607

[22] Filed: Aug. 11, 1993

Related U.S. Application Data

[63] Continuation of Ser. No. 741,774, Aug. 7, 1991, abandoned.

[30] Foreign Application Priority Data

Aug. 8, 1990 [JP] Japan .................. 2-209666

[51] Int. Cl.$^6$ .............................................. G02B 6/00
[52] U.S. Cl. .................................... 385/142; 372/6; 385/129
[58] Field of Search ............... 385/24, 141, 142, 129; 372/6

[56] References Cited

U.S. PATENT DOCUMENTS 4,848,998 7/1989 Snitzer et al. ...................... 65/3.11

FOREIGN PATENT DOCUMENTS 0313209 4/1989 European Pat. Off. .
8701246 2/1987 WIPO .
8802133 3/1988 WIPO .

OTHER PUBLICATIONS

R. M. Percival et al, "Characterization of Spontaneous and Stimulated Emission from Praseodymium (Pr3+) Ions Doped Into a Silica-Based Monomode Optical Fiber", IEEE Journal Of Quantum Electronics, vol. 25, No. 10, Oct. 1989, pp. 2119–2123, New York.

K. Kubodera et al, "A slab waveguide laser formed of glass-clad LiNdP4012", J. Appl. Phys., vol. 49, No. 1, Jan. 1978, pp. 65–68.

M. V. Babukova et al, "Investigation of neodymium silicate glass diffused waveguides", Soviet Journal Of Quantum Electronics, vol. 15, No. 9, Sep. 1985, pp. 1304, 1305.

R. Wolfe et al, "Single mode magneto-optic waveguide films", Appl. Phys. Lett., vol. 48, No. 8, 24 Feb. 1986, pp. 508–510.

Primary Examiner—Rodney B. Bovernick
Assistant Examiner—John Ngo
Attorney, Agent, or Firm—Cushman Darby & Cushman

[57] ABSTRACT

An optically active device comprising an optical fiber, a light source and an optical device is disclosed. The optical fiber comprises a core made of an optical functioning glass doped with $Pr^{3+}$ as an active ion and transmits light at a first wavelength. The light source generates excitation light at a second wavelength shorter than the first wavelength. The optical device directs the excitation light from the light source into the optical fiber. Then, $Pr^{3+}$ in the core of the optical fiber is stimulated to emit light at the second wavelength. As a result, an optical function such as optical amplification can be effected at the second wavelength.

9 Claims, 7 Drawing Sheets

OPTICAL FIBRE, WAVEGUIDE, AND OPTICAL ACTIVE DEVICE

This is a continuation of application Ser. No. 07/741,774, filed on Aug. 7, 1991, which was abandoned upon the filing hereof.

BACKGROUND OF THE INVENTION

1. Field of the Invention

The present invention relates to an optical fiber and a waveguide used for optical amplification at 1.65 $\mu$m Wavelength band and other wavelength bands, and an optical active device using the same.

2. Related Background Art

Many efforts have been made to manufacture a fiber amplifier by using an optical fiber to which a rare-earth element such as Nd is added, in order to apply it to the field of optical communication at 1.3 $\mu$m band, 1.55 $\mu$m band, and the like. Furthermore, a fiber amplifier at, e.g., 1.65 $\mu$m wavelength band is now required to be used for a failure detection system for the maintenance and the like of an optical communication system of 1.55 $\mu$m band. Such a fiber amplifier is required since 1.65 $\mu$m band is longer than 1.55 $\mu$m band and is an operation band of a semiconductor laser.

SUMMARY OF THE INVENTION

The present invention has been made in consideration of the above situation, and has as its object to provide an optical fiber and a waveguide which allows optical function such as optical amplification at a 1.65 $\mu$m wavelength band and other wavelength band, and an optical active device using the same.

It is another object of the present invention to provide an optical fiber including a core made of optical functioning glass doped with praseodymium ion ($Pr^{3+}$) as an active ion for optical amplification.

According to the above optical fiber $Pr^{3+}$ as an active ion is excited by excitation light having a first wavelength, which is introduced into the core, to enable $Pr^{3+}$ emission at a second wavelength longer than the first wavelength. The second wavelength is limited by an energy level difference inherent in $Pr^{3+}$. When light having the second wavelength is incident on $Pr^{3+}$ in an exited state, $Pr^{3+}$ is stimulated by this light to emit light having the second wavelength. As a result, an optical function such as optical amplification, laser oscillation, or optical switching can be effected at the second wavelength.

It is still another object of the present invention to provide a waveguide device comprising a planar waveguide made of optical functioning glass doped with $Pr^{3+}$ as an active ion for optical amplification.

It is still another object of the present invention to provide an optically active device comprising the optical fiber for transmitting light having a first wavelength, a light source for generating excitation light having a second wavelength shorter than the first wavelength, and optical means for directing the excitation light from the light source into the optical fiber. The first wavelength is set to be in 1.65 $\mu$m band, and the second wavelength can be set to be, e.g., in 1.4 $\mu$m band or less, for example, the second wavelength can be one of 1.4 $\mu$m, 1.0 $\mu$m, and 0.5 $\mu$m. In addition, the optical fiber may be replaced with a waveguide device doped with $Pr^{3+}$. In this case, however, the optical fiber is preferably used to obtain a long optical transmission path. This is because a population inversion if $Pr^{3+}$ can be caused with a lower threshold value by utilizing the properties of the optical fiber, e.g., a small optical loss.

According to the above optically active device, $Pr^{3+}$ as an active ion is excited by excitation light having the first wavelength which is introduced into the core of the optical fiber or the planar waveguide of the waveguide device, thus causing a population inversion at the energy levels of $Pr^{3+}$. As a result, $Pr^{3+}$ can emit light at the second wavelength longer than the first wavelength. When light having the second wavelength is incident on $Pr^{3+}$ in an excited state, $Pr^{3+}$ is stimulated by this light to emit light having the second wavelength. As a result, an optical function such as optical amplification or laser oscillation can be effected at the second wavelength.

A case wherein the first and second wavelengths are respectively set in 1.65 $\mu$m band and 1.4 $\mu$m band will be described in detail below. $Pr^{3+}$ as an active ion is excited by excitation light at 1.4 $\mu$m band, which introduced into the core or the planar waveguide. More specifically, electrons at a ground level $^3H_4$ are temporarily excited by this excitation light up to an energy level $^3F_4$ and are subsequently transited to a level $^3F_4$ by multiple phonon relaxation. When a population inversion is caused between the levels $^3F_3$ and $^3H_4$ by such excitation and non-radiation transition, emission at 1.65 $\mu$m wavelength band can be performed. In this state, when light at 1.65 $\mu$m band is incident on excited $Pr^{3+}$, $Pr^{3+}$ is stimulated by this light to emit light at 1.65 $\mu$m band. As a result, an optical function such as optical amplification can be effected at 1.65 $\mu$m wavelength band.

It is still another object of the present invention to provide an amplifier comprising the optical active device and a coupling means for coupling signal light having the first wavelength into an optical fiber or a waveguide device.

According to the optical amplifier, $Pr^{3+}$ as an active ion is excited by excitation light having the first wavelength which is introduced into a core or a planar waveguide. As a result, $Pr^{3+}$ can emit light at the second wavelength longer than the first wavelength. When signal light having the second wavelength is incident on excited $Pr^{3+}$, $Pr^{3+}$ is stimulated by this signal light to emit light having the second wavelength. As a result, amplification of the signal light at the second wavelength can be performed.

It is still another object of the present invention to provide a laser comprising the optical active device and a resonator means for feeding light having the first wavelength back to an optical fiber or a waveguide device.

According to the laser, $Pr^{3+}$ is excited by excitation light having the first wavelength which is introduced into a core or a planar waveguide. A portion of excited $Pr^{3+}$ is stimulated by radiation light having a second wavelength which emerges from a core or a planar waveguide, and light having the second wavelength which is fed back to the core or the planar waveguide, thus emitting radiation light having the second wavelength. By repeating this operation, optical oscillation at the second wavelength can be performed.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art form this detailed description.

DESCRIPTION OF THE PREFERRED EMBODIMENTS

Embodiments of the present invention will be described below with reference to the accompanying drawings.

Figure 1:
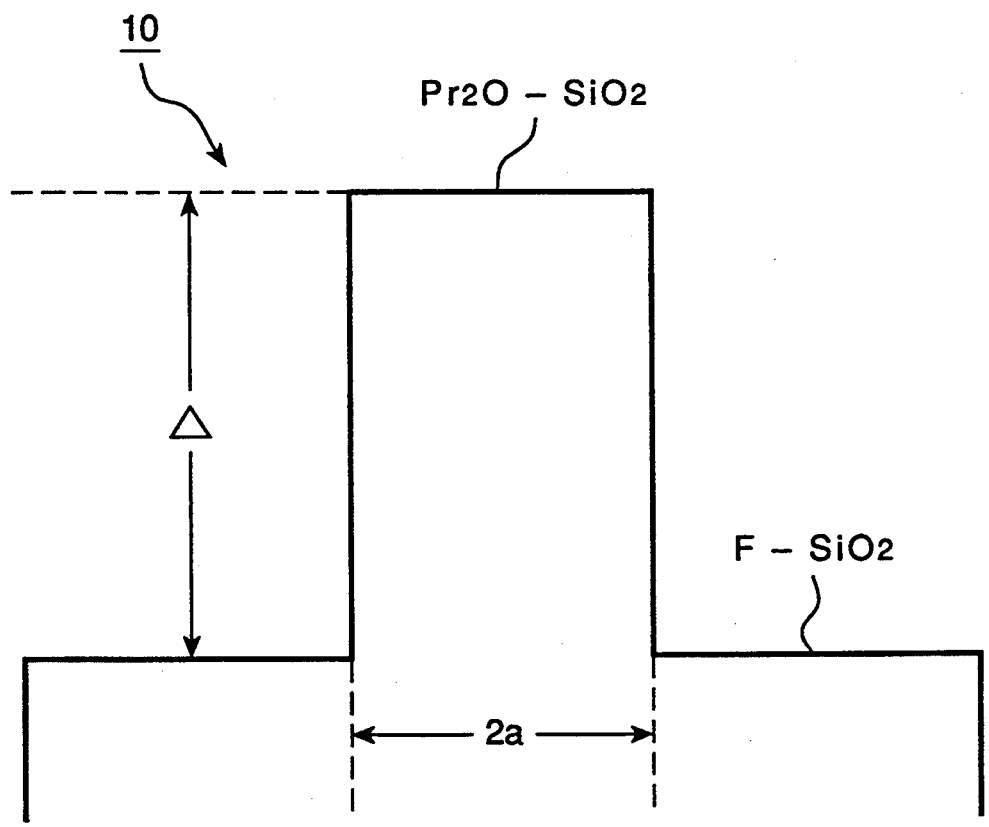
FIG. 1 is a view showing the structure of an optical fiber according to the present invention.

Referring to FIG. 1, an optical fiber 10 is of a single-mode (SM) type and is constituted by a core obtained by adding praseodymium oxide to silica glass, and a cladding obtained by adding fluorine (F) to silica glass. The optical fiber 10 has a core diameter of 5.1 μm and an outer diameter of 125 μm. A relative refractive index Δ between the core and the cladding is about 0.64%. The following table shows various specifications of the optical fiber 10 in FIG. 1.

| Relative Refractive Index Δ (%) | 0.64 |
| --- | --- |
| Core Diameter (μm) | 5.1 |
| Cut-Off Wavelength (μm) | 1.0 |
| Modefield Diameter (μm) ⓐ1.55 μm | 7.6 |
| Pr Concentration (ppm) | 310 |

The process of manufacturing the optical fiber in FIG. 1 will be briefly described below. A matrix material of silica glass doped with $Pr^{3+}$ oxide is prepared as a core material for an optical fiber and is fused to be formed into a glass rod for the core. The concentration of praseodymium ion as an active ion added to the silica glass is set to be 310 ppm in weight. Subsequently, a predetermined amount of fluorine is added to glass silica to form a cladding pipe. No praseodymium ions are added to the cladding pipe. The core rod and the cladding pipe are formed into a preform by the rod-in tube method. This preform is set in a known wire drawing apparatus to form an optical fiber. As a result, an SM fiber having a core diameter of 5.1 μm and an outer diameter of 125 μm is obtained. This SM fiber is then cut to have a length of 50 m, thus obtaining a sample for measurement.

Figure 2:
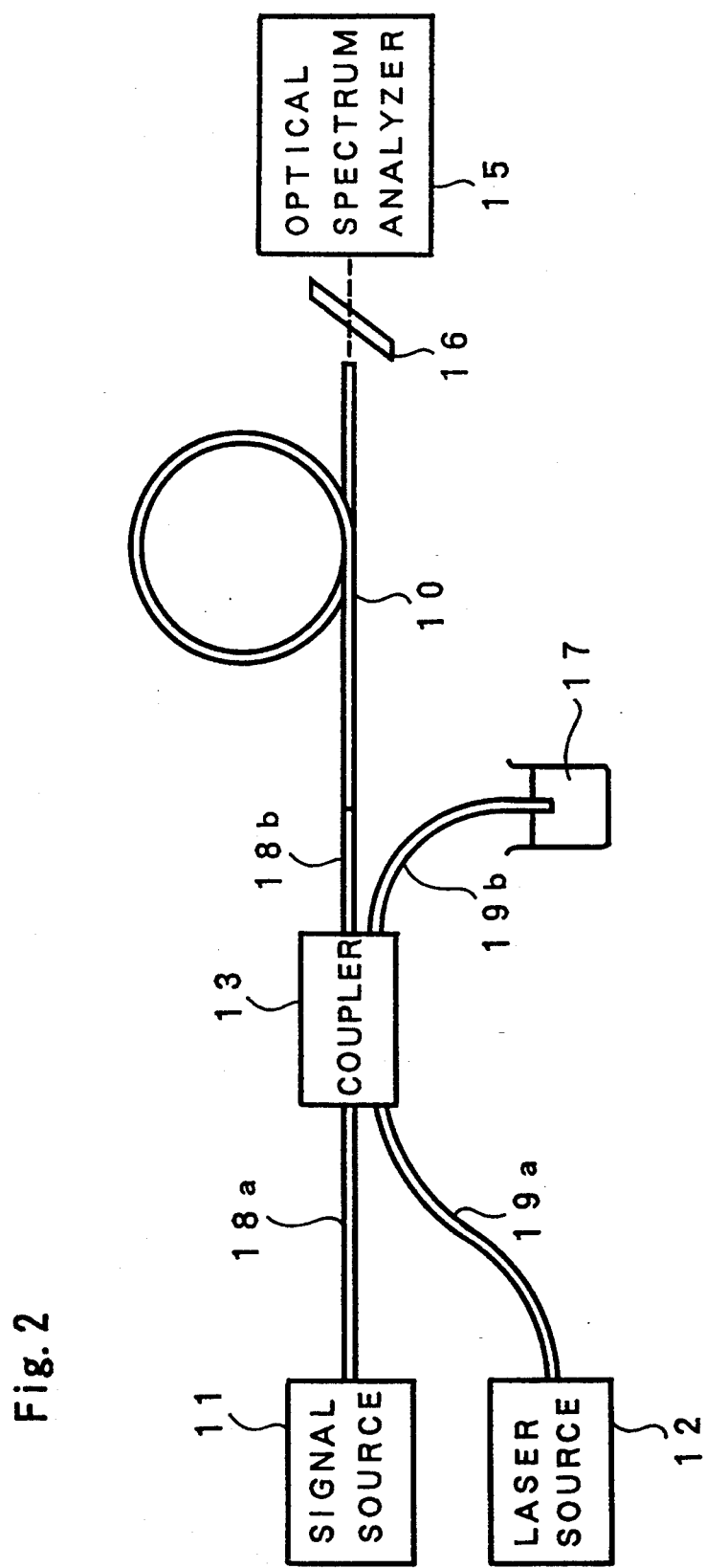
FIG. 2 is a view showing a fiber amplifier according to the present invention.

FIG. 2 shows a 1.65 μm fiber amplifier using the optical fiber shown in FIG. 1. As a signal light source 11, a semiconductor laser having an output wavelength band of 1.65 μm band is used. One end of an optical fiber 18a is optically connected to the output side of the signal light source 11, while the other end of the optical fiber 18a is connected to the input side of a coupler 13. A semiconductor laser having an output wavelength band of 1.4 μm band is used as a laser source 12 serving as an excitation light source. One end of an optical fiber 19a is optically connected to the output side of the laser source 12, while the other end of the optical fiber 19a is connected to the input side of the coupler 13. The coupler 13 is a fused bi-conceal taper coupler which is formed by fusing/extending two optical fibers 18 and 19. The distal end of one optical fiber 19b extending from the output side of the coupler 13 is dipped in a matching oil 17 to prevent the return of light. The distal end of the other optical fiber 18b is connected to one end of an optical fiber 10 through a connector or the like. This optical fiber 10 has the same structure as that shown in FIG. 1. That is, the optical fiber 10 is an SM fiber having a length of 50 m and including a core consisting of silica glass doped with $Pr^{3+}$. An optical spectrum analyzer 15 is arranged at the other end, i.e., the output side, of the optical fiber 10, while a filter 16 is arranged therebetween.

An operation of the fiber amplifier in FIG. 2 will be briefly described below. Excitation light at 1.4 μm band which is generated from the laser source 12 is incident on the coupler 13 through the optical fiber 19a and is further introduced into the optical fiber 10 through the optical fiber 18b. Since the core of the optical fiber 10, on which the excitation light is incident, is doped with $Pr^{3+}$ as an active ion, $Pr^{3+}$ is excited by the excitation light to be set in a predetermined state. As a result, $Pr^{3+}$ is set in a state wherein light at 1.65 μm can be emitted.

Figure 3:
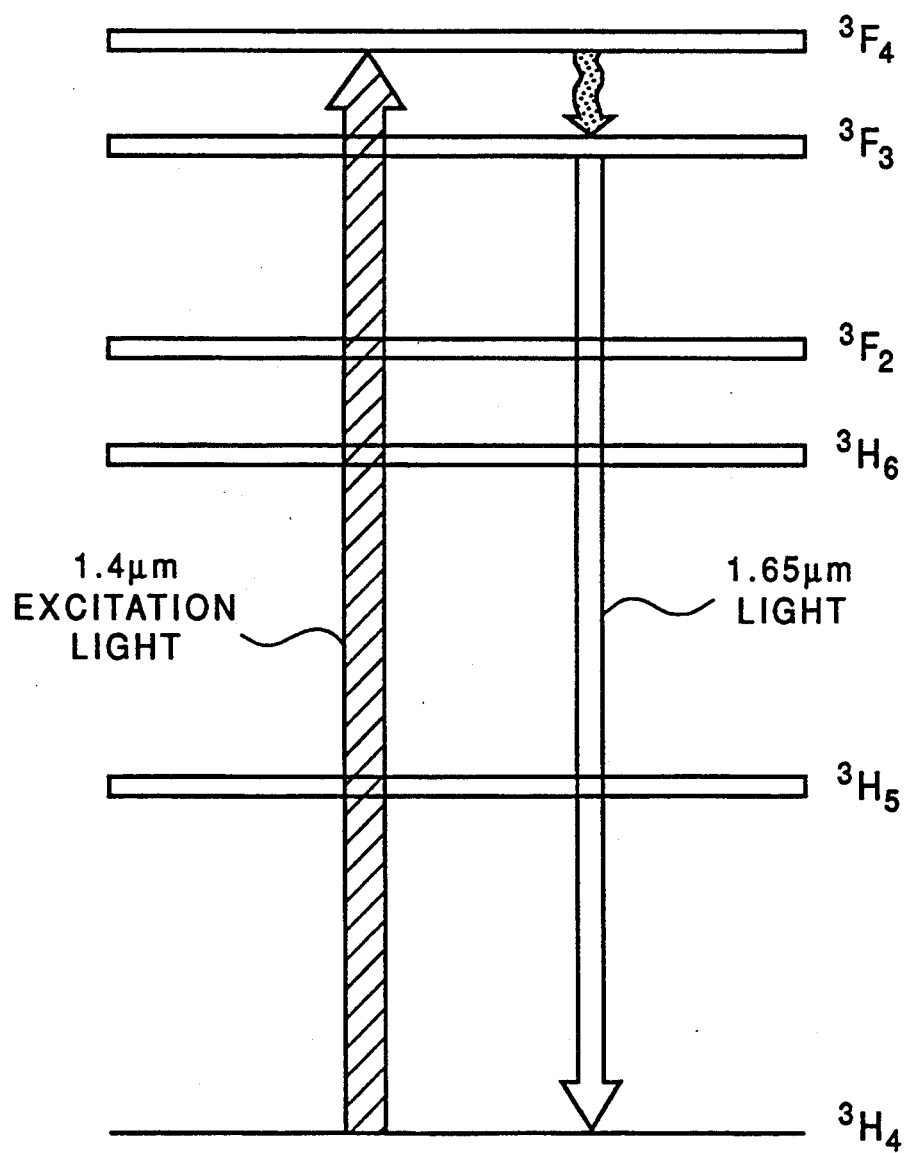
FIG. 3 is an energy-level diagram for explaining excitation of $Pr^{3+}$ by 1.4 μm excitation light at 1.4 μm band.

FIG. 3 shows the energy levels of $Pr^{3+}$ added to a glass sample such as silica glass. $Pr^{3+}$ is excited by excitation light at 1.4 μm band which is introduced into the optical fiber. As a result, electrons at a ground level $^3H_4$ are temporarily excited up to a level $^3F_4$, and they transit to a level $^3F_3$ to discharge energy such as phonons. When a population inversion occurs between the levels $^3F_3$ and $^3H_4$ upon such excitation and mon-radiation, three-level emission with a peak wavelength in 1.65 μm band can be performed. Signal light 1.65 μm band which is emitted from the signal light source 11 is incident on the coupler 13 through the optical fiber 18a. The signal light incident on the coupler 13 is combined with excitation light from the laser source 12 and is coupled into the optical fiber 10. The signal light incident on the optical fiber 10 stimulates $Pr^{3+}$, which has been excited to be capable of emission, to emit stimulated light at 1.65 μm band. With this process, the excitation light and the amplified signal light are output from the output side of the optical fiber 10. Of these light components, the excitation light is cut by the filter 16. Therefore, only the amplified signal light is incident on the optical spectrum analyzer 15, and the gain of optical amplification by means of the optical fiber doped with $Pr^{3+}$ can be measured.

The measurement result of an optical gain obtained by the fiber amplifier shown in FIG. 2 will be described below. The wavelength of excitation light which was emitted from the laser source 12 and was incident on the optical fiber was set to be 1.43 μm, and its input light power was 20 mW. In addition, the wavelength of signal light which was emitted from the signal light source 11 and was incident on the optical fiber was set to be 1.65 μm, and its input light power was −30 dBm. It was found from the measurement result obtained by the optical spectrum analyzer 15 that the optical gain of the fiber amplifier of this embodiment was about 10 dB.

Figure 4:
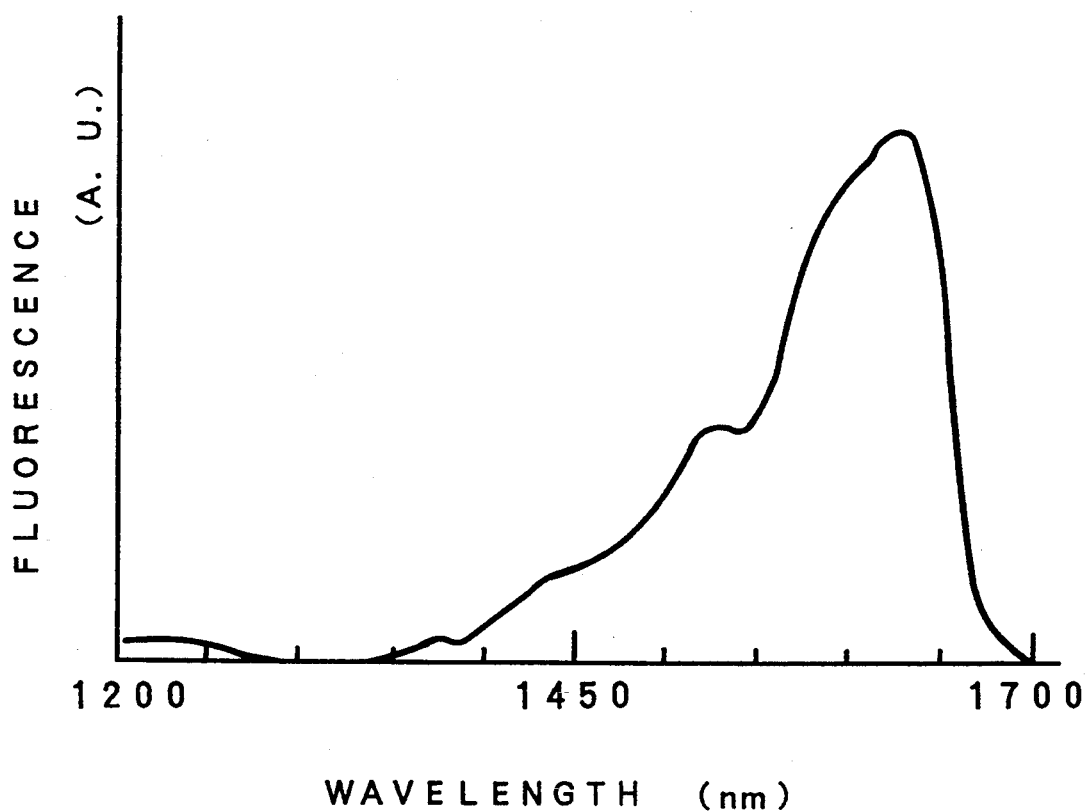
FIG. 4 is a graph showing $Pr^{3+}$ fluorescence characteristics.

The optical amplification at 1.65 μm band has been described. However, the fiber amplifier shown in FIG. 2 can be used for optical amplification at other wavelengths. FIG. 4 is a graph showing the fluorescence characteristics of $Pr^{3+}$ in quartz glass. As is apparent from FIG. 4, optical amplification by means of $Pr^{3+}$ can be realized in a wide wavelength region centering around a wavelength of 1.65 μm.

Figure 5:
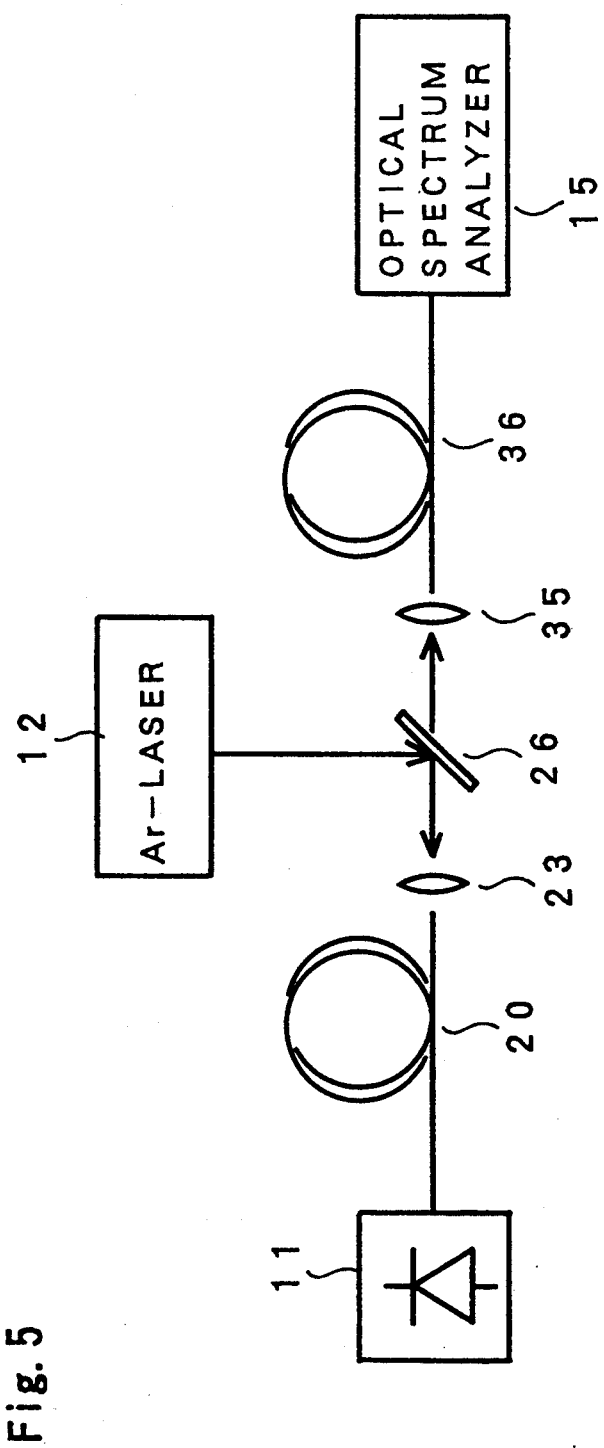
FIG. 5 is a view showing a fiber amplifier according to another embodiment of the present invention.

FIG. 5 shows a 1.65 μm fiber amplifier according to another embodiment of the present invention. As a laser source 12, an Ar laser for emitting excitation light at 0.5 μm band is used. Output light from the laser source 12 is introduced into an optical fiber 20 through a half mirror 26 and a lens 23. A semiconductor laser having an output of 1.65 μm wavelength band is used as a signal light source 11. An optical fiber connected to the output side of the signal light source 11 is connected to one end of the optical fiber 20 through a proper means such as a connector. Signal light emerging from the optical fiber 20 is focused by the lens 23 and subsequently passes through the half mirror 26 for cutting excitation light. Thereafter, the signal light is introduced into a dummy fiber 36 extending from an optical spectrum analyzer 15 through a lens 35.

The optical fiber 20 is an SM fiber having substantially the same structure as that of the optical fiber 10. That is, the optical fiber 20 comprises a core obtained by adding $Pr^{+3}$ oxide to silica glass, and a cladding obtained by adding F to silica glass. The concentration of $Pr^{+3}$ in the core is 310 ppm. The optical fiber 20 has a core diameter of 6 μm and an outer diameter of 125 μm. A relative refractive index Δ between the core and the cladding is about 0.64%. The total length of the optical fiber 20 is 50 m.

An operation of the fiber amplifier will be briefly described below with reference to FIG. 5 Excitation light at 0.5 μm band which is generated from the laser source 12 is introduced into the optical fiber 20 through the half mirror 28 and the like. The core of the optical fiber 20, on which the excitation light is incident, is doped with $Pr^{3+}$ as an active ion. Therefore, electrons of $Pr^{3+}$ are excited by the excitation light to have levels $^1I_0$, $^1D_2$, and the like and are substantially relaxed into a level $^3F_3$. $Pr^{3+}$ in this state is capable of emitting light at 1.65 μm band. Meanwhile, signal light at 1.65 μm band which is emitted from the signal light source 11 is also introduced into the optical fiber 20. The signal light incident on the optical fiber 20 stimulates $Pr^{3+}$, which has been excited to be capable of emission, to emit stimulated light at 1.65 μm band. With this process, the excitation light and the amplified signal light are output from the output side of the optical fiber 20. Of these light components, the excitation light is cut by the half mirror 26. As a result, only the amplified signal light is incident on the optical spectrum analyzer 15, and hence the gain of the optical amplification by means of the optical fiber doped with $Pr^{3+}$ can be measured.

The measurement result of an optical gain obtained by the fiber amplifier shown in FIG. 5 will be described below. Multiline light such as 0.488 μm and 0.514 μm components was used as excitation light to be emitted from the laser source 12 and be incident on the optical fiber, and its input light was set to be 1 mW. In addition, the wavelength of signal light which was emitted from the signal light source 11 and was incident on the optical fiber was set to be 1.64 μm, and its input light power was −13 dBm. It was found from the measurement result obtained by the optical spectrum analyzer 15 that the optical gain of the fiber amplifier of this embodiment was about 1 dB.

Figure 6:
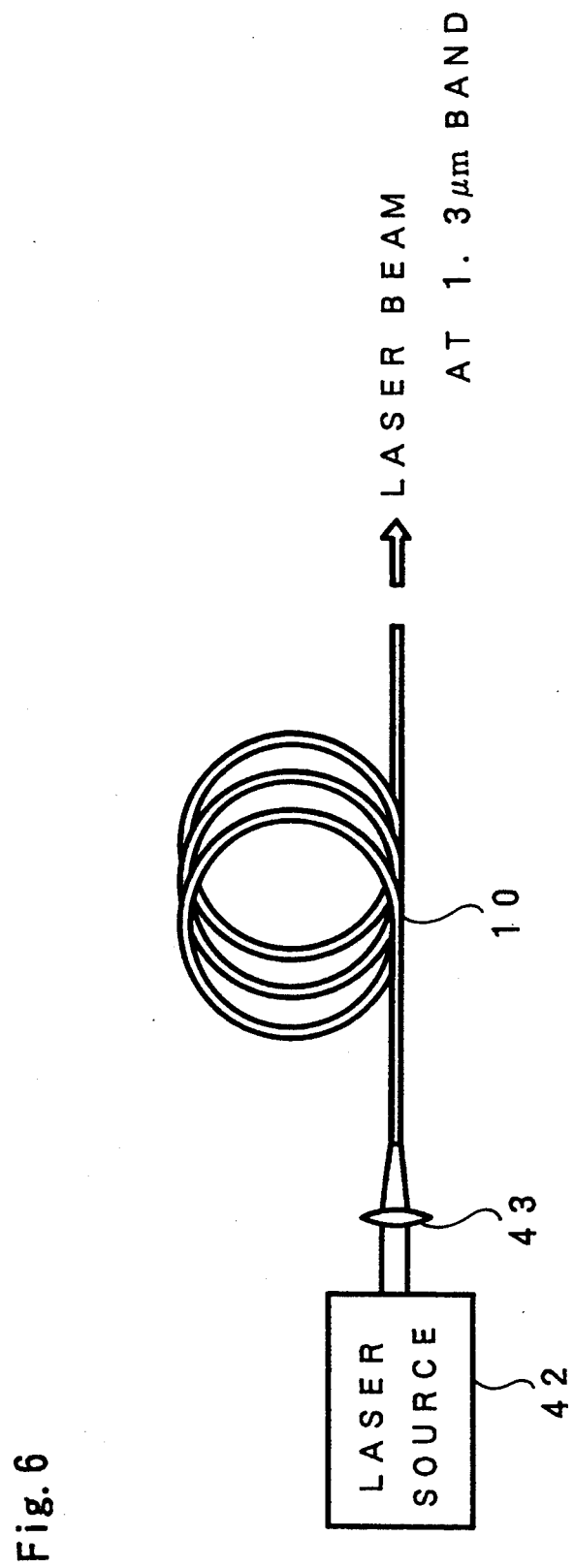
FIG. 6 is a view showing a fiber laser according to the present invention.

FIG. 6 shows an embodiment of a fiber laser. This fiber laser comprises an optical fiber 10, a laser source 42 constructed by a semiconductor laser and a lens 43. The laser source 42 emits excitation light at 1.4 μm band. The lens 43 guides the excitation light from the laser source 42 into the optical fiber 10. In this case, the input and output ends of the optical fiber 10 are properly mirror-finished to form a resonator structure. Note that the resonator structure may be of a general type using a Fabry-Perot type dielectric mirror and the like.

In the above-described fiber laser, the excitation light at 1.4 μm band from the laser source 42 is introduced into the optical fiber 10 through the lens 43. The excitation light excites $Pr^{3+}$ in the optical fiber 10. Excited $Pr^{3+}$ is stimulated by 1.65 μm spontaneous light to emit radiation light at 1.65 μm band corresponding to a transition of $^3F_3 \rightarrow ^3H_4$. When the output of the excitation light exceeds a predetermined value, laser oscillation occurs at 1.65 μm wavelength band.

Figure 7:
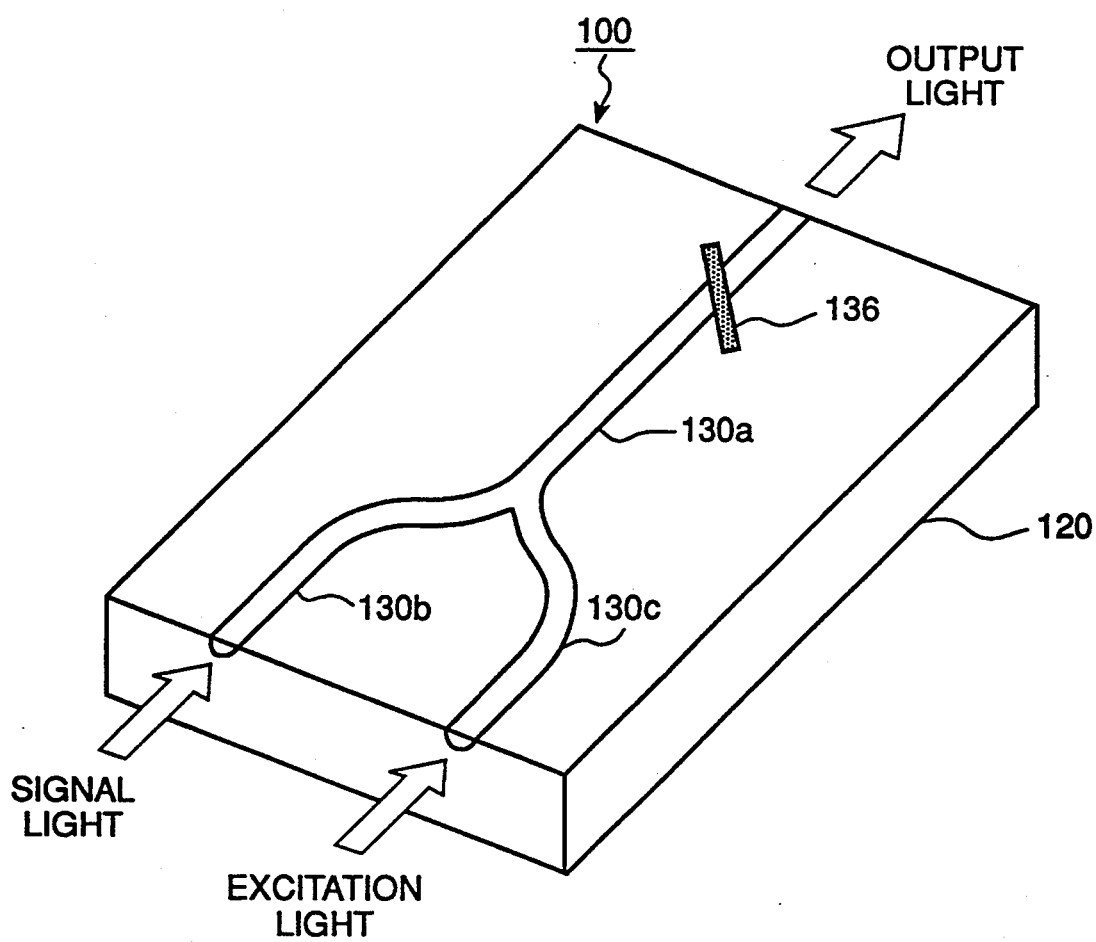
FIG. 7 is a view showing a waveguide amplifier according to the present invention.

FIG. 7 shows an embodiment of a waveguide amplifier. On a substrate 120, planar waveguides 130a, 130b, and 130c are formed to constitute a bifurcated structure. The planar waveguide 130a is doped with $Pr^{3+}$ as an active ion. A filter 136 constituted by a grating is formed at the other end of the planar waveguide 130a. Signal light at 1.65 μm band is incident on the planar waveguide 130b. In addition, excitation light at 1.4 μm band is incident on the planar waveguide 130c. A laser source similar to that shown in FIG. 6 is used for this embodiment.

An operation of a waveguide amplifier 100 in FIG. 7 will be described below. The signal light at 1.65 μm band is introduced into the planar waveguide 130a through the planar waveguide 130b. The excitation light at 1.4 μm band or the like from an excitation light source such as a semiconductor laser is also introduced into the planar waveguide 130a through the planar waveguide 130c. The excitation light excites $Pr^{3+}$ as an active ion. Excited $Pr^{3+}$ is induced by the signal light to emit radiation light at 1.65 μm band corresponding to a transition of $^3F_3 \rightarrow ^3H_4$. When the intensity of the excitation light exceeds a predetermined value, the signal light is amplified.

The present invention is not limited to the above-described embodiments. For example, as a matrix glass material for a core, a silicate glass, a phosphate glass, a fluoride glass, or the like may be used. In this manner, the matrix glass composition can be changed so that the wavelength for emission or stimulated emission near a wavelength of 1.65 μm can be adjusted.

From the invention thus described, it will be obvious that the invention may be varied in many ways. Such variations are not to be regarded as a departure from the spirit and scope of the invention, and all such modifications as would be obvious to one skilled in the art are intended to be included within the scope of the following claims.

We claim:
1. An optically active device comprising:
   an optical fiber for transmitting light at a first wavelength, said optical fiber comprising a core includ- ing an optical functioning glass doped with $Pr^{3+}$ as an active ion;

a light source for generating excitation light at a second wavelength in 1.4 μm band or less; and optical means for directing the excitation light from said light source into said waveguide device, wherein said first wavelength in a 1.65 μm band produced by the population inversion between the energy level $^3F_3$ to that of $^3H_4$.

2. A fiber amplifier according to claim 1, wherein the first wavelength is included in 1.65 μm band, and the second wavelength is shorter than the maximum of 1.4 μm band.

3. A fiber amplifier according to claim 1, wherein the second wavelength is included in one of 1.4 μm band, 1.0 μm band, and 0.5 μm band.

4. A fiber amplifier according to claim 1, wherein said first wavelength is 1.65 μm and said second wavelength is 1.4 μm.

5. An optically active device comprising:

a waveguide device comprising a planer waveguide made of optical active glass, for transmitting light at a first wavelength;

a light source for generating excitation light at a second wavelength in 1.4 μm band or less;

a optical means for directing the excitation light from said light source into said waveguide device;

said glass being doped with $Pr^{3+}$ as an active ion and said first wavelength in a 1.65 μm band produced by the population inversion between the energy level $^3F_3$ and $^3H_4$.

6. A device according to claim 5, wherein the second wavelength is included in one of 1.4 μm band, 1.0 μm band, and 0.5 μm band.

7. An optically active device according to claim 5, wherein said first wavelength is 1.6 μm and said second wavelength is 1.4 μm.

8. A waveguide amplifier comprising:

an optically active device including:

a waveguide device comprising a planer waveguide including an optical active glass, for transmitting light at a first wavelength;

a light source for generating excitation light at a second wavelength in 1.4 μm band or less;

optical means for directing said excitation light from said light source into said waveguide device;

coupling means for coupling signal light at said first wavelength into said waveguide device, wherein said glass being doped with $Pr^{21}$ as an active ion and said first wavelength in a 1.65 μm band produced by the population inversion between the energy level $^3F_3$ and $^3H_4$.

9. A waveguide laser comprising:

an optically active device including:

a waveguide device comprising a planer waveguide including an optical active glass, for transmitting light at a first wavelength;

a light source for generating excitation light at a second wavelength in 1.4 μm band or less;

optical means for directing said excitation light from said light source into said waveguide device; and resonator means for feeding light at the first wavelength from said waveguide device back to said waveguide device, wherein said glass being doped with $Pr^{3+}$ as an active ion and said first wavelength in a 1.65 μm band produced by the population inversion between the level $^3F_3$ and $^3H_4$.

* * * * *